US009607436B2

(12) United States Patent
Malamud et al.

(10) Patent No.: US 9,607,436 B2
(45) Date of Patent: Mar. 28, 2017

(54) GENERATING AUGMENTED REALITY EXEMPLARS

(75) Inventors: Mark Malamud, Seattle, WA (US); Royce Levien, Lexington, MA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 341 days.

(21) Appl. No.: 13/879,594

(22) PCT Filed: Aug. 27, 2012

(86) PCT No.: PCT/US2012/052505
§ 371 (c)(1),
(2), (4) Date: Apr. 15, 2013

(87) PCT Pub. No.: WO2014/035367
PCT Pub. Date: Mar. 6, 2014

(65) Prior Publication Data
US 2014/0204119 A1   Jul. 24, 2014

(51) Int. Cl.
*G06T 19/00*   (2011.01)
*G06F 17/30*   (2006.01)
*G06K 9/00*    (2006.01)

(52) U.S. Cl.
CPC ........ *G06T 19/006* (2013.01); *G06F 17/3005* (2013.01); *G06F 17/3071* (2013.01); *G06K 9/00671* (2013.01)

(58) Field of Classification Search
None
See application file for complete search history.

(56) References Cited

U.S. PATENT DOCUMENTS 5,835,094 A   11/1998   Ermel et al.
5,874,966 A   2/1999    Polimeni et al.
(Continued)

FOREIGN PATENT DOCUMENTS

EP    2418623 A1      2/2012
JP    2002366594 A    12/2002
(Continued)

OTHER PUBLICATIONS

Author Unknown, "Find nearby restaurants with Yelp iPhone app: now including augmented reality," http://www.examiner.com/computers-in-new-york/find-nearby-restaurants-with-yelp-iphone-app-now-including-augmented-reality, Sep. 16, 2009, 4 pages.
(Continued)

*Primary Examiner* — Xiao Wu
*Assistant Examiner* — Steven Elbinger
(74) *Attorney, Agent, or Firm* — Dorsey & Whitney LLP

(57) ABSTRACT

Technologies are generally described for automatic clustering and rendering of augmentations into one or more operational exemplars in an augmented reality environment. In some examples, based on a user's context, augmentations can be retrieved, analyzed, and grouped into clusters. Exemplars can be used to render the clusters as conceptual representations of the grouped augmentations. An exemplar's rendering format can be derived from the grouped augmentations, the user's context, or formats of other exemplars. Techniques for grouping the augmentations into clusters and rendering these clusters as exemplars to a user can enhance the richness and meaning of an augmented reality environment along contextually or user-determined axes while reducing the sensorial and cognitive load on the user.

26 Claims, 9 Drawing Sheets

(56) References Cited

U.S. PATENT DOCUMENTS

| | | | |
|---|---|---|---|
| 6,037,936 | A | 3/2000 | Ellenby et al. |
| 6,252,597 | B1 | 6/2001 | Lokuge |
| 7,071,842 | B1 | 7/2006 | Brady |
| 7,313,574 | B2 | 12/2007 | Paalasmaa et al. |
| 7,565,139 | B2 | 7/2009 | Neven, Sr. et al. |
| 7,725,077 | B2 | 5/2010 | Jung et al. |
| 7,870,496 | B1 | 1/2011 | Sherwani |
| 2003/0009469 | A1* | 1/2003 | Platt et al. ............... 707/100 |
| 2005/0039133 | A1 | 2/2005 | Wells et al. |
| 2005/0076056 | A1 | 4/2005 | Paalasmaa et al. |
| 2005/0289158 | A1 | 12/2005 | Weiss et al. |
| 2006/0047704 | A1 | 3/2006 | Gopalakrishnan |
| 2006/0277474 | A1 | 12/2006 | Robarts |
| 2007/0050468 | A1 | 3/2007 | Gazit |
| 2007/0088497 | A1 | 4/2007 | Jung |
| 2007/0100868 | A1 | 5/2007 | Hackmann |
| 2008/0275844 | A1 | 11/2008 | Buzsaki et al. |
| 2009/0005077 | A1 | 1/2009 | Forstall et al. |
| 2009/0055754 | A1* | 2/2009 | Finn ................. A63F 13/12 715/757 |
| 2009/0102859 | A1 | 4/2009 | Athsani et al. |
| 2009/0167787 | A1 | 7/2009 | Bathiche et al. |
| 2009/0177484 | A1 | 7/2009 | Davis et al. |
| 2009/0239587 | A1 | 9/2009 | Negron et al. |
| 2009/0262084 | A1 | 10/2009 | Yu |
| 2009/0289956 | A1 | 11/2009 | Douris et al. |
| 2009/0322671 | A1 | 12/2009 | Scott et al. |
| 2010/0036968 | A1 | 2/2010 | Vance et al. |
| 2010/0120450 | A1 | 5/2010 | Herz |
| 2010/0134318 | A1 | 6/2010 | Haughawout et al. |
| 2010/0169790 | A1 | 7/2010 | Vaughan et al. |
| 2011/0041095 | A1 | 2/2011 | Reed |
| 2011/0113345 | A1 | 5/2011 | Choi |
| 2011/0131510 | A1* | 6/2011 | DeLuca ............. A63D 13/42 715/757 |
| 2011/0138317 | A1 | 6/2011 | Kang et al. |
| 2011/0138416 | A1 | 6/2011 | Kang et al. |
| 2011/0161875 | A1 | 6/2011 | Kankainen |
| 2011/0167392 | A1 | 7/2011 | Dicke et al. |
| 2011/0238690 | A1 | 9/2011 | Arrasvuori et al. |
| 2011/0246891 | A1 | 10/2011 | Schubert et al. |
| 2011/0252318 | A1 | 10/2011 | Helms |
| 2011/0310120 | A1 | 12/2011 | Narayanan |
| 2011/0316845 | A1 | 12/2011 | Roberts et al. |
| 2012/0038671 | A1* | 2/2012 | Min et al. ............... 345/633 |
| 2012/0072387 | A1 | 3/2012 | Yanase |
| 2012/0075341 | A1* | 3/2012 | Sandberg .......... G06F 3/147 345/633 |
| 2012/0075433 | A1* | 3/2012 | Tatzgern et al. ............. 348/50 |
| 2012/0084662 | A1 | 4/2012 | Navarro et al. |
| 2012/0098859 | A1* | 4/2012 | Lee ................. G06K 9/6807 345/633 |
| 2012/0102050 | A1* | 4/2012 | Button et al. ............... 707/749 |
| 2012/0105475 | A1 | 5/2012 | Tseng |
| 2012/0113138 | A1 | 5/2012 | Uusitalo et al. |
| 2012/0113223 | A1 | 5/2012 | Hilliges et al. |
| 2012/0162254 | A1 | 6/2012 | Anderson et al. |
| 2012/0173979 | A1 | 7/2012 | Lee |
| 2012/0182205 | A1 | 7/2012 | Gamst |
| 2012/0212405 | A1 | 8/2012 | Newhouse et al. |
| 2012/0230538 | A1 | 9/2012 | Calman et al. |
| 2012/0274652 | A1* | 11/2012 | Sung et al. ............... 345/592 |
| 2013/0007668 | A1 | 1/2013 | Liu et al. |
| 2013/0011009 | A1 | 1/2013 | Chen et al. |
| 2013/0027428 | A1* | 1/2013 | Graham et al. ............. 345/633 |
| 2013/0051615 | A1 | 2/2013 | Lim et al. |
| 2013/0124311 | A1 | 5/2013 | Sivanandan et al. |
| 2013/0155108 | A1 | 6/2013 | Williams et al. |
| 2014/0033059 | A1 | 1/2014 | Schubert et al. |
| 2014/0139465 | A1 | 5/2014 | Grosberg |
| 2014/0223323 | A1 | 8/2014 | Kasahara |
| 2014/0282162 | A1 | 9/2014 | Fein et al. |

FOREIGN PATENT DOCUMENTS

| | | |
|---|---|---|
| JP | 2012-090077 A | 5/2012 |
| JP | 2012094138 A | 5/2012 |
| WO | 2012/033768 A2 | 3/2012 |
| WO | 2012038585 A1 | 3/2012 |

OTHER PUBLICATIONS de-las-Heras-Quirós et al., "Mobile Augmented Reality browsers should allow labeling objects A Position Paper for the Augmented Reality on the Web W3C Workshop," http://www.w3.org/2010/06/w3car/mar_browsers_should_allow_labeling)objects.pdf, May 30, 2010, 1-5.

FlexHex, Inv. Softworks LLC, "User-Defined Icons," http://www.flexhex.com/docs/help/advanced/icons,phtml, © 2007, Accessed Mar. 24, 2011, 1 page.

Henry et al., The Interaction Technique Notebook, "Multidimensional Icons," ACM Transactions on Graphics, Jan. 1990, 9(1), 133-137.

International Patent Application No. PCT/US2012/052505: International Search Report and Written Opinion dated Nov. 2, 2012, 16 pages.

Julier et al., "Information filtering for mobile augmented reality," International Symposium on Augmented Reality, Proc. ISAR '00, Oct. 5-6, 2000, Munich, Germany, 3-11.

MacGregor et al., "MetaDesk: A Semantic Web Desktop Manager," International Workshop on Knowledge Markup and Semantic Annotation, SemAnnot 2004, Hiroshima, Japan, 2004, 107-110.

Mobile Behavior: an Omnicom Group Company, "WTF Augmented Reality: Part 1, The Basics," http://209.249.12.87/mobilebehavior/2009/06/15/wtf-augmented-reality-part-1-the-basics/, Jun. 15, 2009, Accessed Mar. 24, 2011, 6 pages.

Peterson et al., "Visual clutter management in augmented reality: Effects of three label separation methods on spatial judgments," IEEE Symposium on 3D User Interfaces, 3DUI 2009, Mar. 14-15, 2009, 111-118.

"7 Amazing Augmented Reality Apps for Android", last accessed Mar. 24, 2011. Jul. 28, 2010, 12.

"An overview of the Layar platform", http://site.layar.com/create/platform-overview , obtained Mar. 7, 2013 at Internet Archive WayBackMachine snapshot of Jan. 29, 2011, web page copyright 2010 Layar.

"AR—it's reality, only better", http://www.ericsson.com/article/augmented_reality_736383515_c, last accessed Mar. 7 2013.

"Augmented Reality, AR Tools and Applications", http://www.augmentedreality.org, Mar. 24, 2011.

"Augmented Reality, Qualcomm Developer Network", http://developer.qualcomm.com/ar , obtained Mar. 7, 2013 at Internet Archive WayBackMachine snapshot of Dec. 23, 2010.

"The MAC App Store", ttp://www.apple.com/mac/app-store/, obtained Mar. 7, 2013 at Internet Archive WayBackMachine snapshot of Jan. 31, 2011.

"Yelp Monocle Hidden Feature Unlocks iPhone Augmented Reality", YouTube, uploaded on Aug. 27, 2009 by gearlive, http://www.youtube.com/watch?v=jHEcg6FyYUo , last accessed Mar. 7, 2013.

Gronbaek, Kai , "Towards Geo-Spatial Hypermedia: Concepts and Prototype Implementation", Hypertext 02, 13th ACM Conference on Hypertext and Hypermedia, ACM New York 2002, 10.

Naisbitt, Jeffrey et al., "Active Interaction: Live Remote Interaction through Video Feeds", University of Illinois, 2006.

Reardon, M , "Augmented reality comes to mobile phones", Reardon, M., "Augmented reality comes to mobile phones," accessed at https://web.archive.org/web/20120223124538/http://news.cnet.com/8301-30686_3-20017965-266.html, posted on Sep. 29, 2010, pp. 5.

Extended European Search Report dated Mar. 21, 2016 received in EP12883675.6.

Itoh, F. et al., "Two-way Navigation System for the Information Space and the Real Space with Internet Cameras", pp. 61-68 (Mar. 23, 1999).

(56) References Cited

OTHER PUBLICATIONS

Ohmura, J. et al., "Location Based Clustering in P2P Multimedia Streaming", IEICE, vol. 110, Issue 373, pp. 37-42 (Jan. 13, 2011).

* cited by examiner

GENERATING AUGMENTED REALITY EXEMPLARS

CROSS-REFERENCE TO RELATED APPLICATION

This application is the U.S. National Stage Entry under 35 U.S.C. § 371 of International Application No. PCT/US2012/052505, filed Aug. 27, 2012, the disclosure of which is incorporated herein by reference in its entirety.

BACKGROUND

Augmented reality (AR) focuses on combining real world and computer-generated data, including computer graphics objects blended into real video and images in real time for display to an end-user. The spread of personal electronic devices such as smartphones and accessibility to data networks and services via the Internet and other networks have enabled access and use of an increasing number of AR applications.

As AR applications and services become increasingly popular, the number of augmentations available in any given context will skyrocket. These augmentations may be visual, auditory, and haptic, and some augmentations may span different modalities. Whether the augmentations are for a particular place and time, a particular object or collection of objects, or for a person or collection of people, the number of augmentations can overwhelm a user's ability to process them.

The user can be overwhelmed when a large number of augmentations are displayed on an augmented reality device, impeding the user's ability to meaningfully and easily review desired augmentations. For example, a user walking through Times Square in New York can be bombarded by several million augmentations from businesses, government organizations, social groups, and end-users (e.g. virtual billboards, restaurant reviews, business placards, artwork, travel directions, messages, graffiti, etc.). Similarly, a user walking through a city park can see tens of thousands of augmented reality avatars jostling for space on the grass. In another example, a user leafing through a copy of Moby Dick may be unable to read a page scribbled over with annotations from thousands of others who have read the book.

SUMMARY

In various embodiments, systems, methods, and computer-readable media are disclosed for clustering and rendering of augmentations into one or more operational "exemplars" or clusters that represent collections of augmentations.

In one embodiment, an augmented reality system can receive a context associated with a user or a user's device. The context may include physical and virtual information about the user's environment, such as the user's location, time of day, the user's personal preferences, the augmented reality services to which the user is subscribed to, an image or object the user is pointing at or selecting, etc. The system can be associated with the user's device or with a service that the user is subscribed to.

In various embodiments, the augmentation system can determine and retrieve augmentations based on the context. Further, the augmentation system can automatically group the retrieved augmentations into clusters, determine rendering formats for each cluster, remove the grouped augmentations from previously rendered augmentations, and render the clusters as exemplars to the user.

In an embodiment, grouping augmentations into clusters and determining rendering formats can be based on the augmentations and the context. For example, the system can analyze the augmentations and the context and determine a conceptual clustering algorithm. The conceptual clustering algorithm can group the augmentations into clusters and associate the clusters with a concept describing properties of the grouped augmentations. The rendering formats of the clusters can be derived from the associated concepts. In a further embodiment, the rendering formats can exhibit several aspects of the clusters, such as appearance, behavior, and interactivity of the grouped augmentations. As such, when the clusters are rendered to a user as exemplars, the exemplars can provide descriptive, rich, informative, and meaningful conceptual summaries of the grouped augmentations.

For example, instead of displaying ten thousand augmented reality avatars crowded into a city park where the avatars represent users from countries around the globe, the avatars may be grouped in just ten exemplar avatars. Each exemplar avatar can be dressed in a flag of a different nation and can be "standing in" for a much larger set of avatars from the indicated nation. Thus, rather than being overwhelmed with ten thousand avatars, a user may see the ten exemplar avatars and decide to communicate with one of the exemplar avatars.

Clustering large numbers of augmentations into smaller sets of exemplars maintains the richness and meaning of an augmented reality environment along contextually or user-determined axes while reducing the sensorial and cognitive load on the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
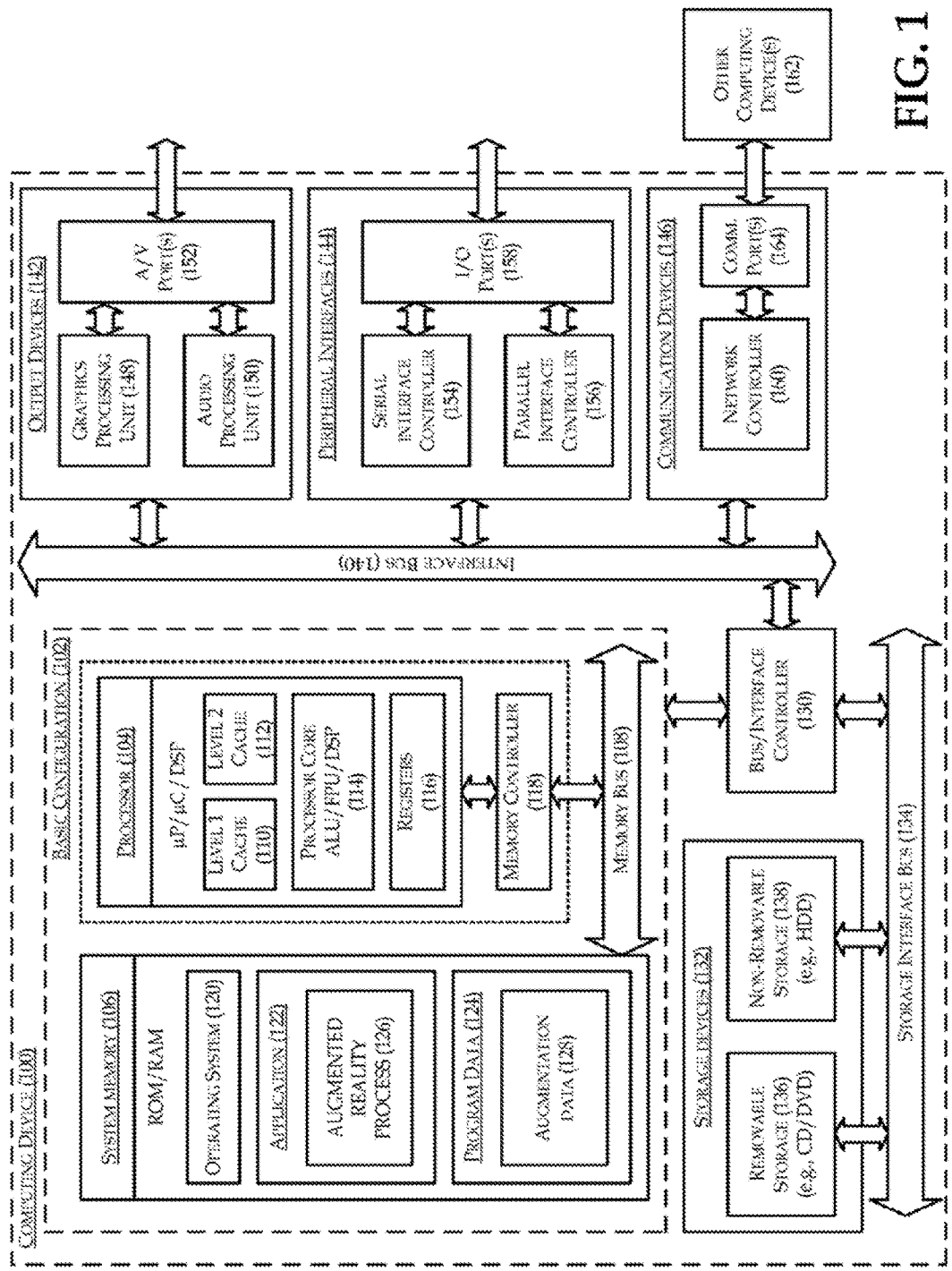
FIG. 1 depicts a block diagram illustrating an example computing device with which various embodiments of the present disclosure may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to augmented reality. Briefly stated, technologies are generally described for a system for processing an augmented reality data, including automatically grouping a number of augmentations into clusters referred to as exemplars and rendering the exemplars in descriptive formats.

FIG. 1 depicts a block diagram illustrating an example computing device 100 with which various embodiments of the present disclosure may be implemented. In a very basic configuration 102, computing device 100 typically includes one or more processors 104 and a system memory 106. A memory bus 108 may be used for communicating between processor 104 and system memory 106.

Depending on the desired configuration, processor 104 may be of any type including but not limited to a microprocessor (μP), a microcontroller (μC), a digital signal processor (DSP), or any combination thereof. Processor 104 may include one more levels of caching, such as a level one cache 110 and a level two cache 112, a processor core 114, and registers 116. An example processor core 114 may include an arithmetic logic unit (ALU), a floating point unit (FPU), a digital signal processing core (DSP Core), or any combination thereof. An example memory controller 118 may also be used with processor 104, or in some implementations memory controller 118 may be an internal part of processor 104.

Depending on the desired configuration, system memory 106 may be of any type including but not limited to volatile memory (such as RAM), non-volatile memory (such as ROM, flash memory, etc.) or any combination thereof. System memory 106 may include an operating system 120, one or more applications 122, and program data 124. Application 122 may include an augmented reality process 126 that is arranged to perform functions as described herein including those described with respect to operations described in FIGS. 3-9. Program data 124 may include augmentation data 128 that may be useful for operation with augmented reality grouping and rendering techniques as is described herein. In some embodiments, application 122 may be arranged to operate with program data 124 on operating system 120 such that augmentations can be grouped into clusters which are then rendered as exemplars using a conceptual format. This described basic configuration 102 is illustrated in FIG. 1 by those components within the inner dashed line.

Computing device 100 may have additional features or functionality, and additional interfaces to facilitate communications between basic configuration 102 and any required devices and interfaces. For example, a bus/interface controller 130 may be used to facilitate communications between basic configuration 102 and one or more data storage devices 132 via a storage interface bus 134. Data storage devices 132 may be removable storage devices 136, non-removable storage devices 138, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 106, removable storage devices 136 and non-removable storage devices 138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 100. Any such computer storage media may be part of computing device 100.

Computing device 100 may also include an interface bus 140 for facilitating communication from various interface devices (e.g., output devices 142, peripheral interfaces 144, and communication devices 146) to basic configuration 102 via bus/interface controller 130. Example output devices 142 include a graphics processing unit 148 and an audio processing unit 150, which may be configured to communicate to various external devices such as a display or speakers via one or more A/V ports 152. Example peripheral interfaces 144 include a serial interface controller 154 or a parallel interface controller 156, which may be configured to communicate with external devices such as input devices (e.g., keyboard, mouse, pen, voice input device, touch input device, etc.) or other peripheral devices (e.g., printer, scanner, etc.) via one or more I/O ports 158. An example communication device 146 includes a network controller 160, which may be arranged to facilitate communications with one or more other computing devices 162 over a network communication link via one or more communication ports 164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 100 may also be implemented as a personal computer including both laptop computer and non-laptop computer configurations.

Figure 2:
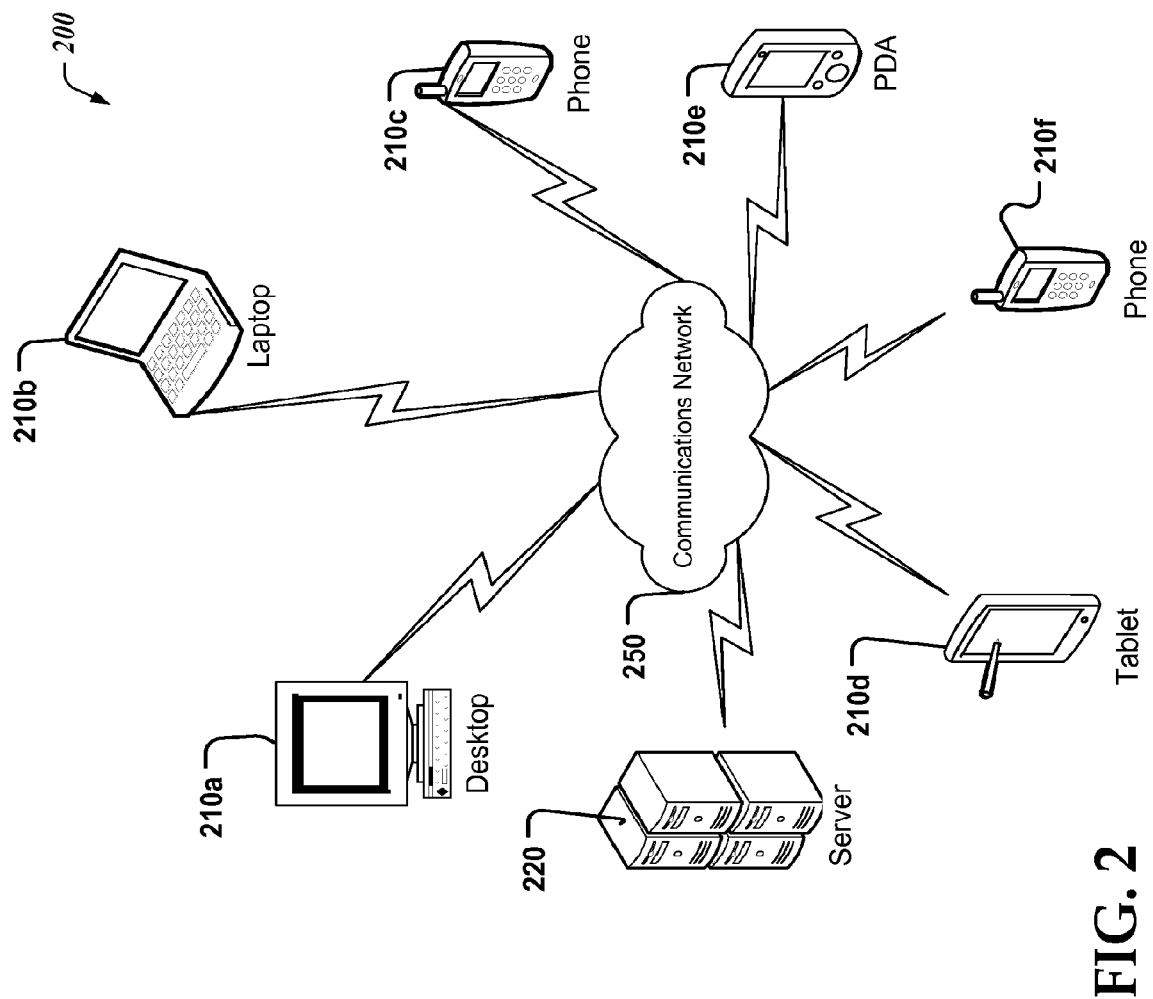
FIG. 2 depicts an example network environment in which various embodiments of the present disclosure may be implemented.

FIG. 2 depicts an example network environment in which various embodiments of the present disclosure may be implemented. In particular, FIG. 2 illustrates an example computing arrangement 200 comprised of computing devices 210 each of which may be adapted to provide augmented reality applications as described herein. The computing devices 210 may comprise, for example, any of a desktop computer 210a, a laptop computer 210b, a phone 210c, a tablet computing device 210d, a personal digital assistant (PDA) 210e, and a mobile phone 210f, each of which may be adapted to process and display augmented reality data to a user.

Each of the devices 210 may be adapted to communicate using a communications network 250. The communications network 250 may be any type of network that is suitable for providing communications between the computing devices 210 and any servers 220 accessed by the computing devices 210. The communications network 250 may comprise a combination of discrete networks which may use different technologies. For example, the communications network 250 may comprise local area networks (LANs), wide area networks (WANs), cellular networks, or combinations thereof. The communications network 250 may comprise wireless, wireline, or combination thereof. In an example embodiment, the communications network 250 may comprise the Internet and may additionally comprise any networks adapted to communicate with the Internet. The communications network 250 may comprise a wireless telephony network that is adapted to communicate video, audio, and other data between the computing devices 210 and the servers 220.

In an embodiment, augmentation data can be processed by an augmented reality device, such as any of the computing devices 210. The augmented reality device can be coupled to an analysis engine or an augmentation service hosted on a computing device, such as the server 220.

In an example scenario, the augmented reality device 210 may be directed, for example, by a user to activate an augmented reality application. The augmented reality device 210 may determine or be associated with a user's context, which may include information associated with physical and virtual environments of the user, such as the user's location, time of day, the user's personal preferences, the augmented reality services to which the user is subscribed to, an image or object the user is pointing at or selecting, etc.

The augmented reality device 210 can communicate with the server 220 over the communications network 250. The server 220 can comprise a repository of augmentation data and can be adapted to provide augmentation services. For example, the server 220 can include a library of clustering and rendering models and algorithms adapted to perform real-time clustering and rendering of augmentations. The augmented reality device 210 can query the server 220 to determine and receive augmentations based on the user's context. In one scenario, the server 220 can transmit augmentations and corresponding rendering formats to the augmented reality device 210 which can render the received augmentations to the user. In an alternative scenario, the server 220 can render the augmentations and transmit the rendered augmentations to the augmented reality device 210.

In yet another scenario, augmentation data can be stored on the augmented reality device 210. As such, grouping and rendering the augmentation data can be processed locally on the augmented reality device 210 eliminating the need for the augmented reality device to query the server 220. In a further scenario, the augmented reality device 210 can be in communication with another computing device 210 to exchange augmentation data and services. For example, the tablet 210d can be adapted to provide an interface to a user and to provide the user's context to the desktop 210a. In turn, the desktop 210a can be adapted to provide augmentation services to the user via the interface tablet 210d.

Figure 3:
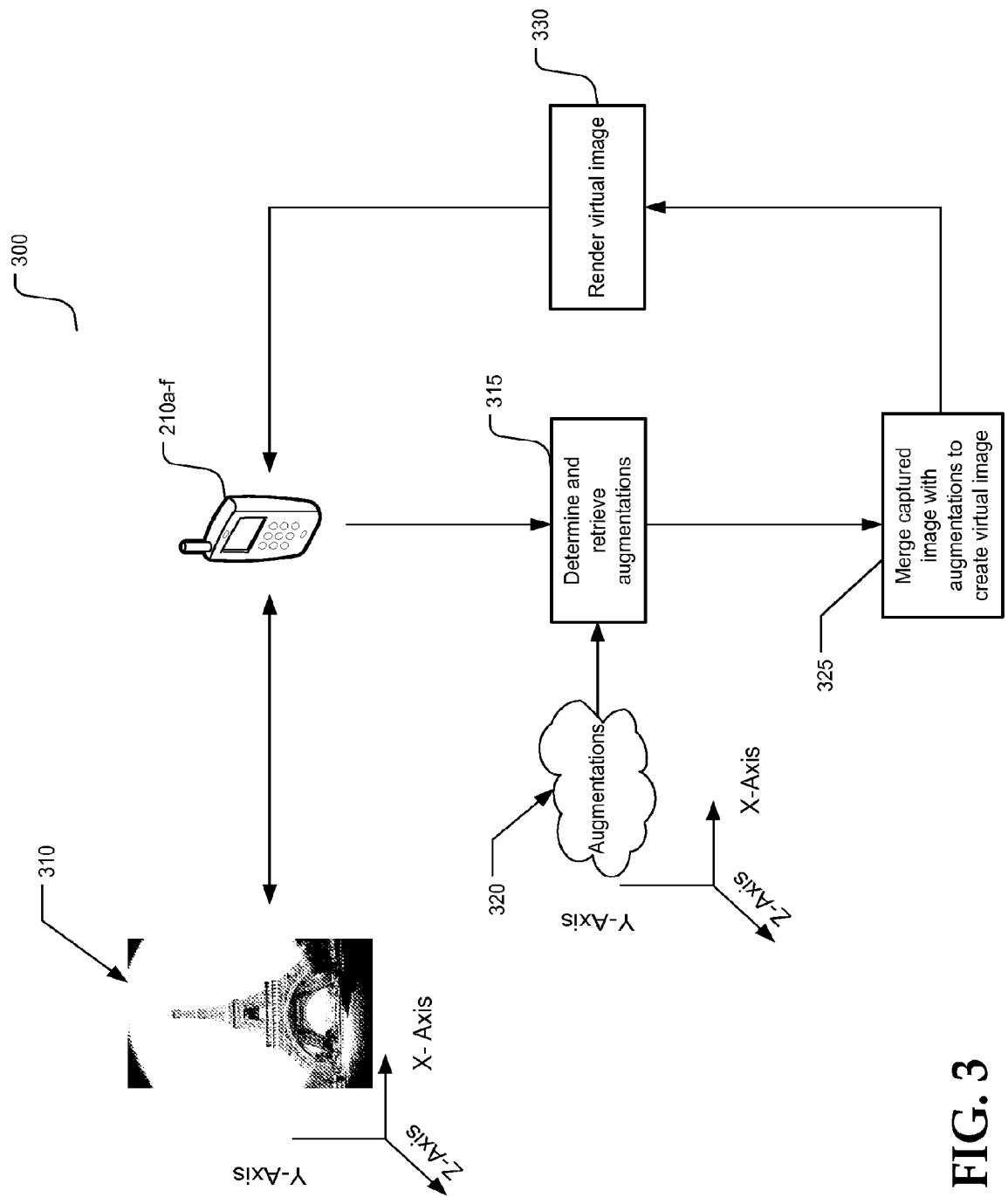
FIG. 3 depicts an illustrative embodiment of an augmented reality system.

FIG. 3 depicts an illustrative embodiment of an augmented reality system 300. A scene 310 may be viewed and captured by the augmented reality device 210. For example, the augmented reality device 210 can integrate an image or a video capture device. Alternatively or additionally, the augmented reality device 210 can be adapted to retrieve an image of the scene 310 based on the user's context. The image can be retrieved from data stored locally on the augmented reality device 210 or externally on another device 210 or the server 220 in communication with the augmented reality device 210 as shown in FIG. 2. The scene 310 may be associated with a set of scene coordinates (X,Y,Z). Based on the image of the scene 310 and/or the user's context, augmentations 320 may be determined and retrieved 315. The augmentations 320 can comprise virtual representations of the scene 310 and of objects or persons associated with the scene 310. For example, the augmentations 320 may comprise other images, metadata, information, or descriptions related to the scene 310. The augmentations 320 may also be associated with a set of coordinates (X,Y,Z). The image of the scene 310 can be merged 325 with the augmentations 320 to generate a virtual image of the scene 310. The virtual image can be rendered 330 and displayed to the user. The generation of the virtual image may be performed with a standard computer graphics system internal or external to the augmented reality device 210. The graphics system may align the image of the scene 310 and the augmentations 320 based on the associated coordinates (X,Y,Z). Further, the graphics system may use real world information about the imaging of the scene 310 so that the virtual image can be correctly rendered. The determination 315 of the augmentations 320, the merging 325 and aligning of the image and the augmentations 320 to create the virtual image, and the rendering 330 of the virtual image can be accomplished locally on the augmented reality device 210, externally on another device 210 or the server 220 in communication with the augmented reality device 210, or can be distributed between the augmented reality device 210, the other devices 210, and the server 220.

Figure 4:
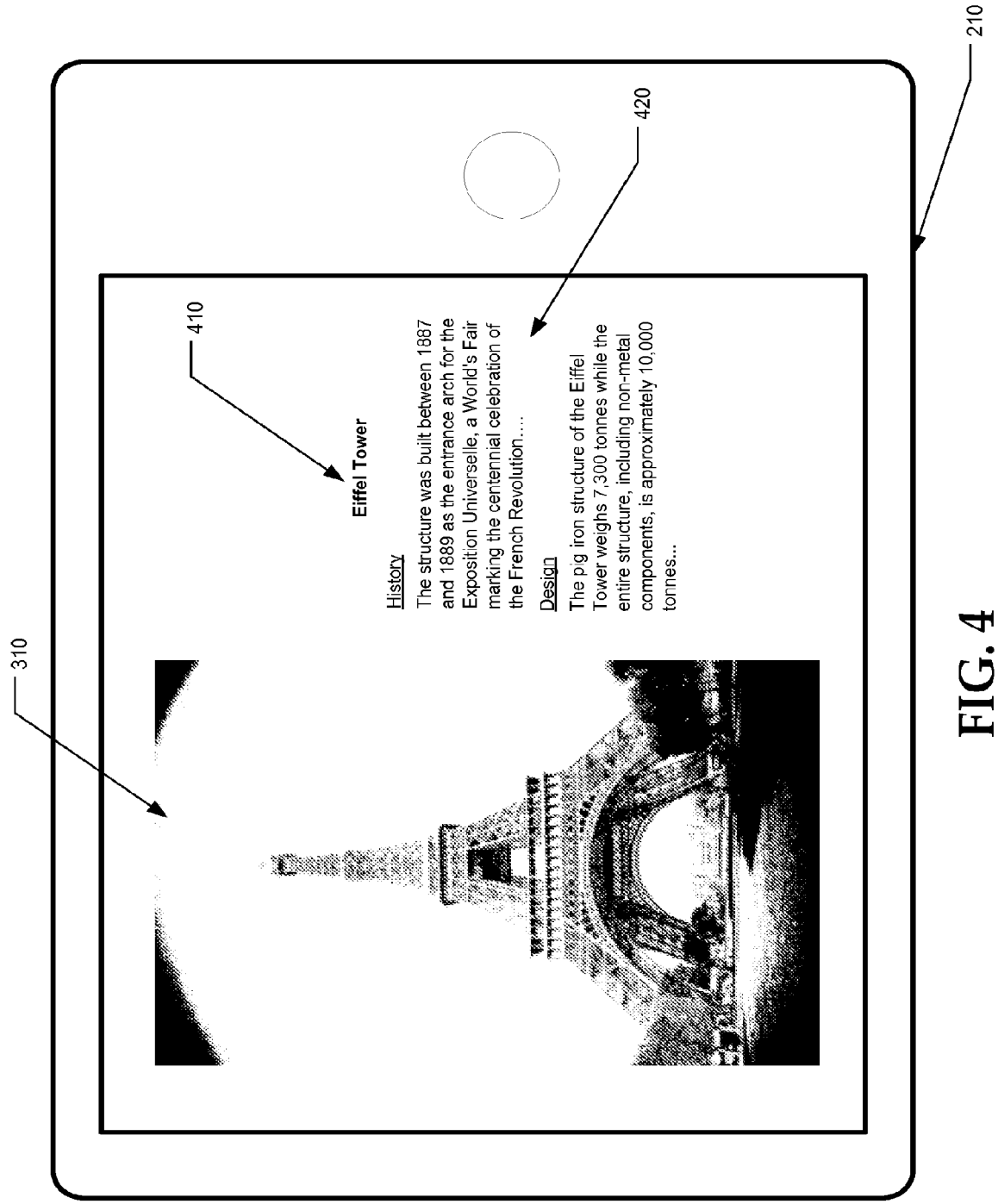
FIG. 4 depicts an example augmented reality display.

FIG. 4 depicts an example augmented reality display. Augmentations of the scene 310 of FIG. 3 can be displayed on the augmented reality device 210 of FIG. 2. The augmentations can, for example, comprise a title 410 of an object contained in the scene and a text description 420 about the object. The augmentations may be overlaid or merged with the image such that the real image and the augmentations may be combined in a single virtual image and presented to the user.

Figure 5:
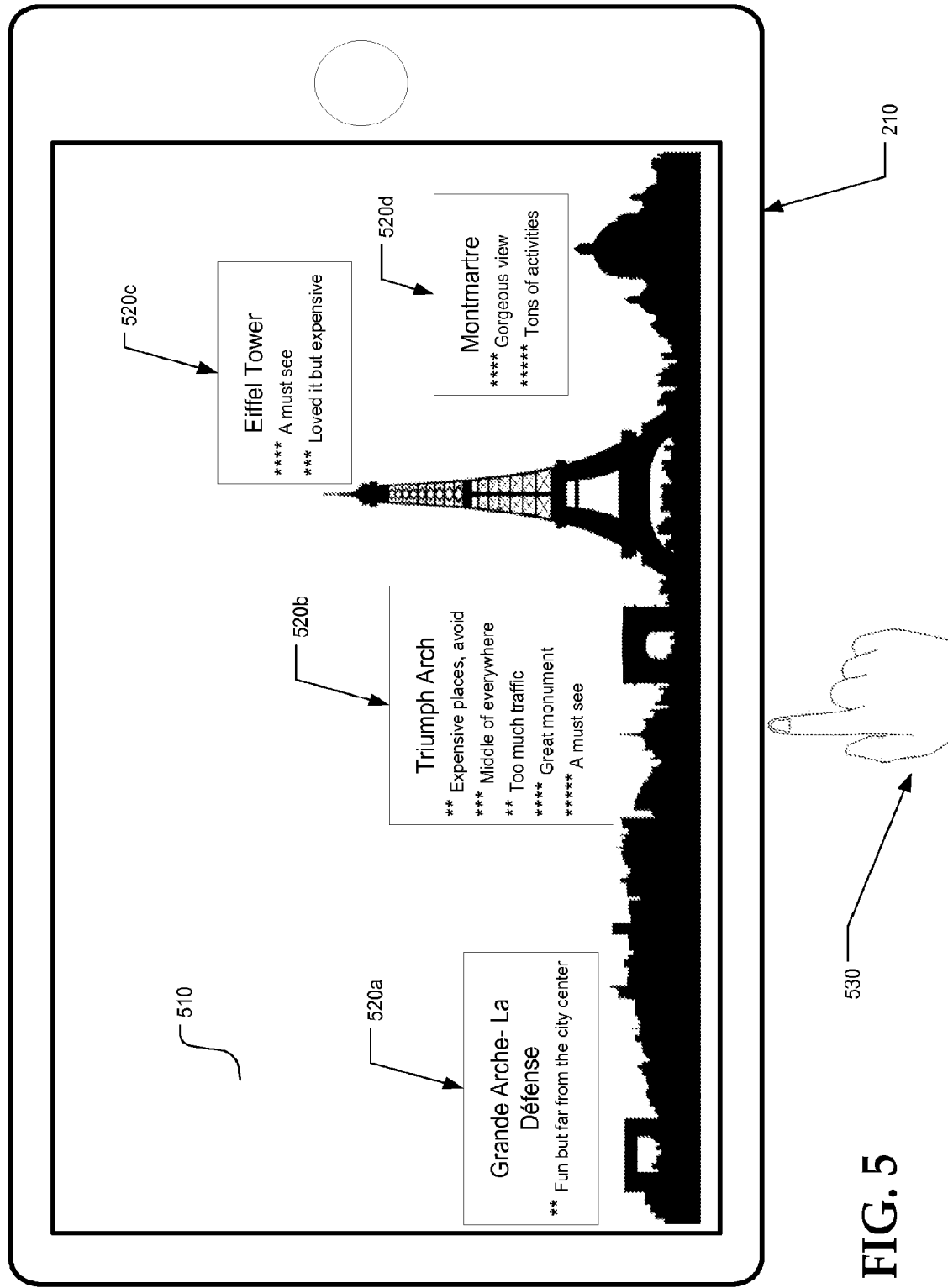
FIG. 5 depicts example augmentations displayed on a computing device.

FIG. 5 depicts example augmentations displayed on a computing device. In particular, FIG. 5 illustrates a virtual image 510 displayed on the augmented reality device 210 of FIG. 2. The virtual image 510 can comprise an image of a scene, such as a panoramic view of Paris or a portion thereof, merged with augmentations 520a-d describing objects or monuments in the scene. The augmentations 520a-d can comprise descriptive titles and comments created by tourists about the objects. A comment can comprise a rating in a form of a one-to-five star scale and a feedback text field. A user 530 can select and expand any number of the augmentations 520a-d. For example, the user 530 can shake the augmented reality device 210, mouse over, single-click, double-tap, or motion over the augmentations 520a-520d to retrieve additional information about the objects contained in the augmentations 520a-d. Additional information can be retrieved from data stored locally or externally to the augmented reality device 210. For example, the additional information may comprise images taken by tourists, a list of attractions nearby, a list of restaurants with menus, prices, advertisement, etc.

In a world where augmented reality has become commonplace, it would be useful to have a way to organize this increasing sensorial and cognitive data. As augmented reality applications and services become increasingly popular, the number of augmentations available in any given context will skyrocket. These augmentations may be visual, auditory, and haptic, and some augmentations may span modalities. Whether the augmentations are for a particular place and time, a particular object or collection of objects, or for a person or collection of people, the number of augmentations can overwhelm a user's ability to process them.

One solution to the problem of "too many augmentations" is to allow the end-user to selectively hide or show them. Such techniques are typically referred to as "filtering." For example, an end-user can set up a filter to remove from sight all the advertisements overlaid on a scene, show only a professor's notes on a copy of Moby Dick, or turn off all audio commentaries during a performance of Swan Lake. However, the filtering techniques may require the end-user to know in advance when and what specific augmentations he or she wants to have available. FIGS. 6-9 present embodiments of alternative or additional techniques to filtering that can maintain the richness and meaning of an augmented reality environment along contextually or user-determined axes while reducing the sensorial and cognitive load on the user. These techniques may comprise automatic grouping of augmentations into clusters and rendering of the clusters based on conceptual formats representative of the augmentations grouped therein.

Figure 6:
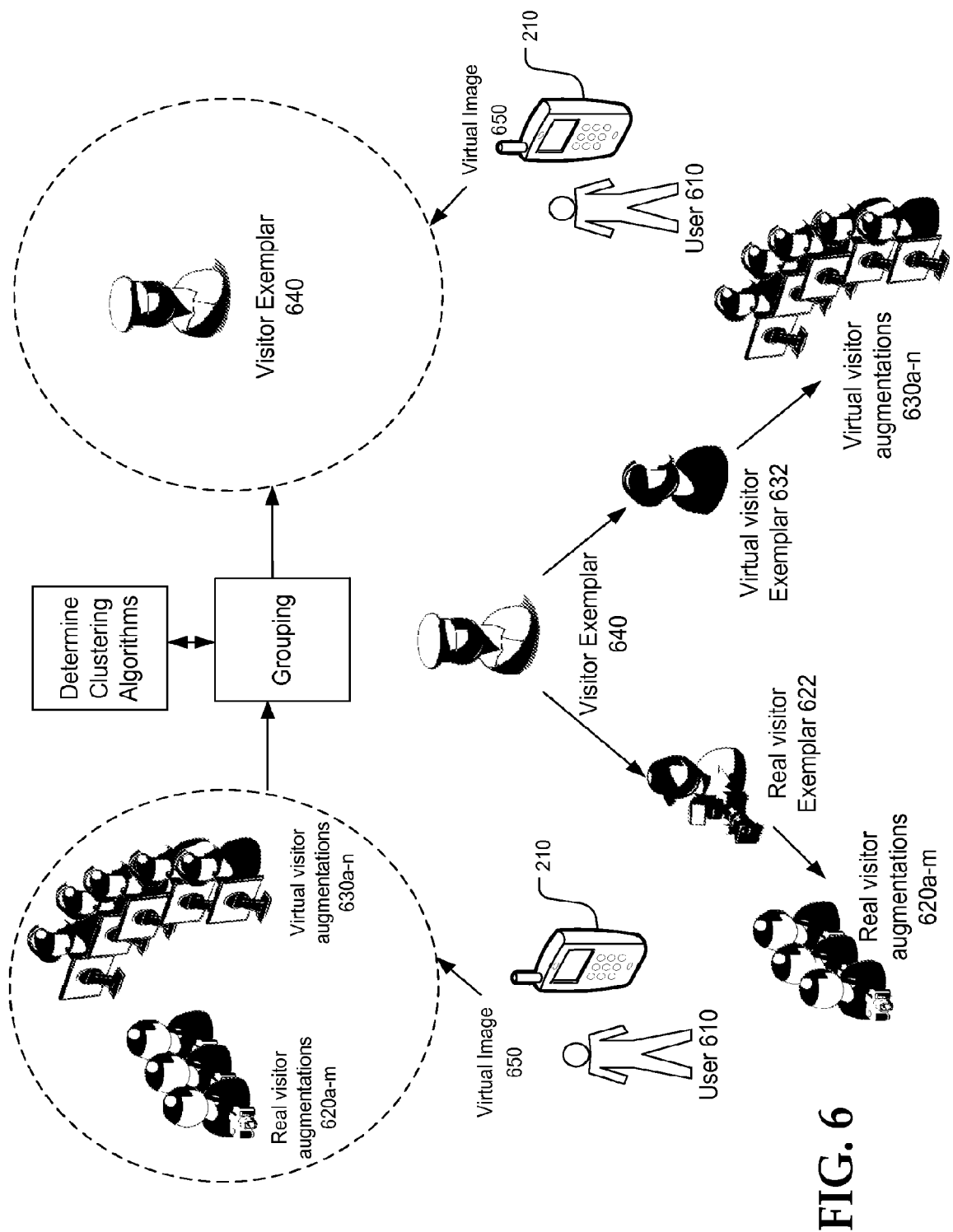
FIG. 6 depicts an example grouping of augmentations into clusters.

FIG. 6 depicts an example grouping of augmentations into clusters. An illustrative example of grouping augmentations into clusters includes a user 610 walking through a park, such as Central Park in New York City, while using the augmented reality device 210. The augmented reality device 210 can render or display a virtual image 650, such as a map of the park overlaid or merged with augmentations. The user 610 can use the augmented reality device 210 to navigate around the virtual image 650, which in this example represents the augmented reality park. There can be a number of real visitor augmentations 620a-m in the virtual image 650 associated with real people. For example, real people can be also walking through the park, and can have augmentations in the form of avatars. Additionally, there can be a large number of virtual visitor augmentations 630a-n in the virtual image 650 associated with virtual people. For example, people from around the world having augmentations in the form of avatars can also be visiting the park virtually at the same time as the user 610. Additionally, the virtual image 650 may comprise many other augmentations and types thereof, which are not represented in FIG. 6 for sake of clarity.

To avoid overwhelming the user 610 with the large number of augmentations 620-630, some or all of the augmentations 620-630 can be grouped into clusters and the clusters can be rendered as exemplars 622, 632, 640.

In an example, the augmentations 620-630 can be initially displayed on the augmented reality device 210. The augmented reality device 210 can, locally or through another computing device, group the real visitor augmentations 620 into a real visitor cluster and the virtual visitor augmentations 630 into a virtual visitor cluster. In turn, the two generated clusters can be grouped into a higher layer visitor cluster. The augmented reality device 210 can display the generated clusters as real visitor exemplar 622, virtual visitor exemplar 632, and visitor exemplar 640. Further, the augmented reality device 210 can remove the grouped augmentations from the initially displayed augmented reality output, i.e. the output comprising all the real visitor augmentations 620 and the virtual visitor augmentations 630 previously displayed, and display the ungrouped augmentations alongside the exemplars 622, 632, 640.

As such, the augmentations 620-630 can be automatically grouped and presented to the user 610 in a simplified augmented reality presentation merged in the virtual image 650. The user 610 can in turn access, communicate with, and expand the exemplars 622, 632, 640. The clustering can be multi-layered and can comprise classes of clusters with hierarchical structures. In this example, the visitor cluster can comprise the real visitor cluster and the virtual visitor cluster. In turn, the real visitor cluster can group the real visitor augmentations 620a-m and the virtual visitor cluster can group the virtual visitor augmentations 630a-n. For sake of clarity, FIG. 6 only depicts two clustering layers (i.e. the visitor cluster as a first layer, and the real and virtual visitor clusters as a second layer). However, embodiments are not limited to the exemplified layers. Additional or different clustering layers and sub-layers can be defined based on the augmentations, the user's context, and other factors.

Grouping augmentations into clusters can comprise analyzing properties of the augmentations available in a given user's context, generating one or more classes of clusters with possible hierarchical category structures based on the analyzed properties, associating each class with a concept description, and using the concept description to group the augmentations into the clusters within the appropriate classes.

In an embodiment, clustering algorithms can be used to generate the clusters and group the augmentations therein. Example clustering algorithms can include conceptual clustering algorithms, such as COBWEB and ITERATE. The conceptual clustering algorithms can comprise machine learning paradigm for unsupervised classification of data that can be adapted to generate concept descriptions and hierarchical category structures associated with classes. For example, the conceptual clustering algorithms can consider properties exhibited by or inherent to the augmentations and other information available to the algorithm, such as the user's context, to generate concepts, classes, and clusters. Other clustering algorithms can include the MICROSOFT CLUSTERING ALGORITHM available with SQL SERVER 2008 and the Balanced Iterative Reducing and Clustering using Hierarchies (BIRCH) algorithm.

In an embodiment, the clustering algorithms can be stored in a library. Based on the user's context and the augmentations, one or more clustering algorithms can be retrieved from the library and applied to the augmentations. For example, the library can comprise an avatar clustering algorithm adapted to group avatar-like augmentations based on the augmentation properties such as social status (e.g. single, married, divorced, in a relationship, etc.), gender, age, activity (e.g. on vacation, running to a meeting, etc.), profession, hobbies, location, spoken languages, personal message, friends, etc. The library can also comprise a facial recognition clustering algorithm that can group avatars by analyzing common facial traits found in images of people associated with the avatars. The facial recognition clustering algorithm can further generate a description of the analyzed common facial traits. In addition, the library can comprise a third conceptual clustering algorithm for grouping augmentations that represent venues by analyzing their locations, distance of a user to the locations, time of the day, nearby attractions, ratings, recommendations, feedback from other users, facts, menus, prices, activities, cuisines, required attire, etc. The stored algorithms can be categorized. For example, the avatar and the facial recognition algorithms can be categorized as applicable to grouping avatars, whereas the venue clustering algorithm can be categorized as applicable to grouping activities. Embodiments are not limited to the exemplified conceptual clustering algorithms. Additional algorithms and categories can be defined and stored in the library.

The augmentations and the user's context can be used to determine an appropriate category of clustering algorithms that can to be applied to the augmentations. The library can be searched, and the appropriate clustering algorithms can be retrieved. For example, when the augmentations represent avatars and the user's context indicates an interest in communicating with people who can speak French and have a moustache, a determined category can comprise avatar grouping algorithms. As such, the library can be searched for an algorithm within that category, and the avatar and the facial recognition clustering algorithms can be retrieved. Other clustering algorithms need not be retrieved.

The retrieved clustering algorithms can be applied to analyze properties of the augmentations. The analysis can comprise comparing the properties to criteria from the user's context. Based on the properties, the user's context, and the comparison, the clustering algorithms can generate classes of clusters with hierarchical structures and concept descriptions associated with the generated classes. The concept descriptions can be used to group the augmentations into the clusters within the appropriate classes. The grouping can comprise adding an augmentation to a generated cluster based on a comparison between the properties of the augmentation and the concept description of the class associated with the generated cluster. Continuing with the avatar example, the avatar clustering algorithm can be applied to generate two classes of clusters. The corresponding concept descriptions can be avatars that can speak French and avatars that can speak only other languages. The facial recognition clustering algorithm can be applied to create two other classes of clusters within the class of French speaking avatars. The additional concept descriptions can be avatars that can speak French and have a moustache and avatars that can speak French and do not have a moustache. As such, a hierarchical structure of cluster classes associated with concept descriptions can be created. In this example, a first hierarchy can comprise a class that groups avatars based on language skills, and a second hierarchy can comprise a class that groups avatars based on facial hair traits. Thus, a total of three clusters can be created: one for avatars that cannot speak French, one for avatars that can speak French but do not have a moustache, and one for avatars that can speak French and have a moustache. The augmentations can be grouped into the clusters based on matches, such as language skills and facial hair traits, between the augmentation properties and the concept descriptions.

The concept descriptions can be further used to generate rendering formats as described herein below. For example, the language skills concept description can be used to render a cluster as an avatar holding a French flag, while the facial hair concept description can be used to add a moustache to the rendered avatar.

Figure 7:
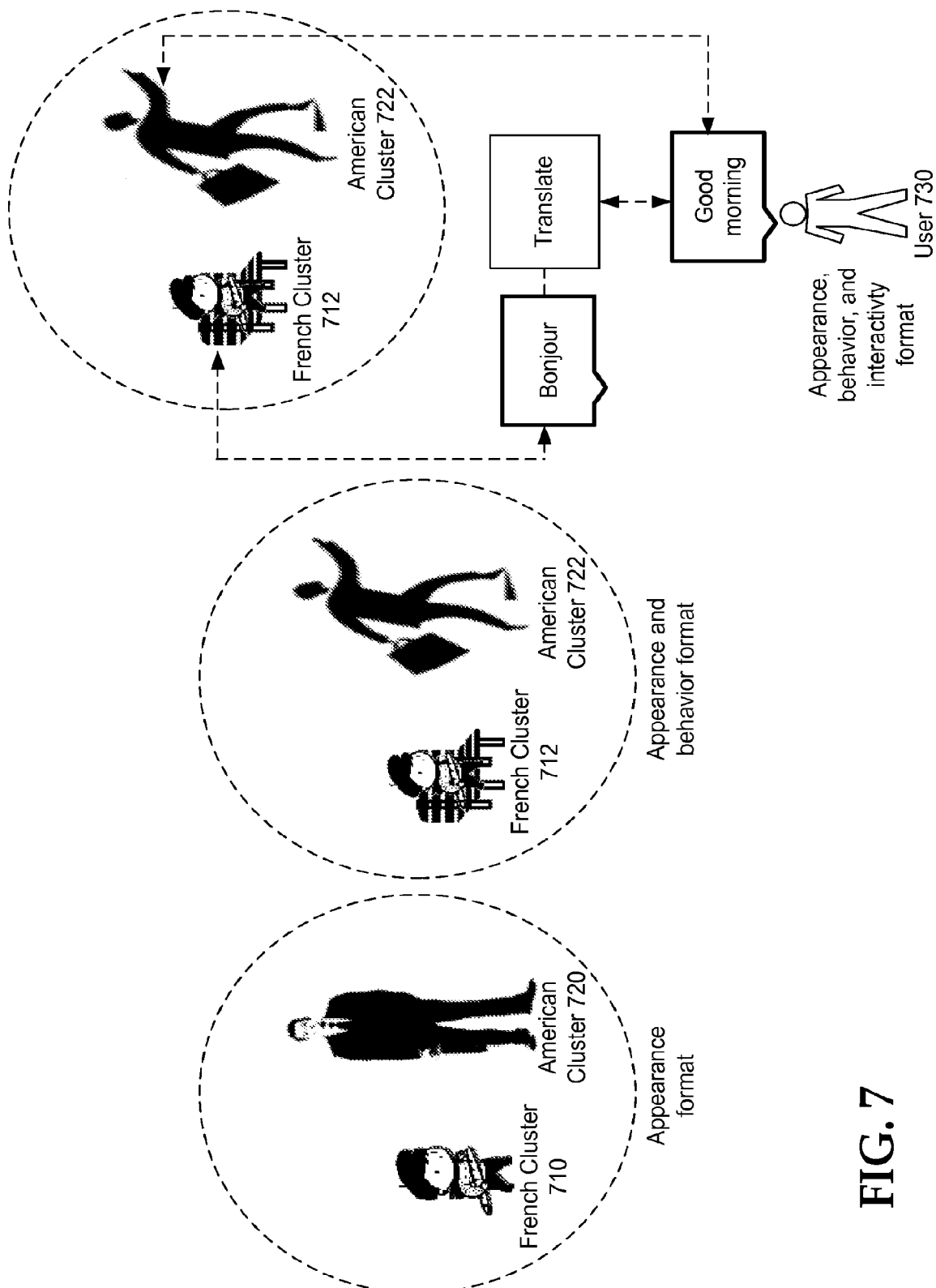
FIG. 7 depicts an example rendering format of an exemplar.

FIG. 7 depicts an example rendering format of an exemplar. Augmentation data can comprise augmentations and clusters of augmentations. The augmentation data can be rendered as exemplars. An augmented reality device, such as any of the devices 210 of FIG. 2, can be used to render the augmentation data. In an embodiment, the augmented reality device can comprise graphics processing units or a computing system adapted to process and render graphics data. In another embodiment, an external computing device, such as server 220 of FIG. 2, can receive, process, and render the augmentation data and transmit the rendered data to the augmented reality device for display to a user 730. In yet another embodiment, the external device can send rendering instructions, format, or information to the augmented reality device which in turn can render the augmentation data based on the received information.

An exemplar can be a conceptual representation used to render a cluster. The conceptual representation can comprise sensorial representations such as visual, auditory, and haptic representations, of a concept description associated with the cluster. The concept description can reflect properties of augmentations grouped into the cluster. Additionally, the exemplar can be created ad-hoc in response to properties of the augmentation data and can comprise semantics and presentation rules of such data. Further, each exemplar can be represented in relation to other exemplars. As such, the exemplar can provide a perceptual summary of the cluster's properties and content. In other words, the exemplar can provide a means to deal with an overabundance of augmentations through intelligent indirection, reducing a user's sensorial and cognitive overload while maintaining the richness and meaning of the original augmentations.

For example, in an augmented reality street scene that contains billboards, restaurants, and avatars, three different classes of exemplars can be created: a class for virtual billboards, a class for restaurant reviews, and a class for avatars. Each of the classes can provide its own rules for presentation. Considering the class of virtual billboards, the billboards can be grouped into a business-related cluster (e.g. an advertisement for a sale at a nearby sporting goods store) and a public service cluster (e.g. a high crime area warning). Each exemplar can express not only distinct characteristics (e.g. appearance, behavior, and interactivity) of the cluster, but also common characteristics shared with others clusters within the same class. As such, the business-related cluster can be rendered as an exemplar comprising a 3D model of a billboard, which can be a common characteristic of the clusters within the class of virtual billboards. Additionally, the exemplar can comprise a "For Sale" sign across the 3D model, which can be a distinct characteristic of the business-related cluster.

Rendering the clusters can comprise determining renderers or rendering formats for the clusters and rendering the clusters as exemplars based on the determined formats. Similar rendering techniques can also be used to render the augmentations as exemplars. As described herein above, the exemplar can comprise a 2D or 3D object providing a conceptual representation of its content to a user. For example, when an augmentation is associated with an avatar, the exemplar can comprise a 3D avatar customized to exhibit properties of the augmentation. As such, if the augmentation represents a middle-aged business man, the object can comprise a male avatar having gray hair, wearing a suit, and carrying a briefcase. Similarly, when augmentations in the form of avatars visiting a park are grouped into clusters based on the avatar nationalities, the corresponding exemplars can be avatars holding flags of the different nations. Further, properties of the augmentations can be reflected at the different cluster hierarchal layers. For example, a top-level cluster of park visitors can comprise lower-level clusters of the park visitors grouped by nationalities. The top-level cluster can be rendered as an avatar sitting on a park bench next to a globe of the world, whereas the lower-level clusters can be rendered as avatars carrying flags of the different nations.

Determining a renderer or a rendering format for a cluster can be accomplished without input from an end-user. The format can be automatically determined based on the augmentation data, the cluster, other clusters, and the user's context.

In an embodiment, the format can be derived from a concept description of the class of clusters. For example, augmentations of visitors to a park can be represented as avatars. The augmentations can be grouped in a multi-tier cluster hierarchy based on the activities of the avatars. First tier clusters can be associated with the concept of an international baseball game between the avatars. Second tier clusters can be associated with the concept of baseball teams from different nations. Third tier clusters can be associated with the concept of active and substitute baseball players. Aspects of the concept descriptions can be used in determining the formats. As such, the first tier cluster can be rendered as an avatar wearing a baseball hat and holding a trophy. The second tier clusters can be represented by avatars wearing national jerseys. The third tier clusters can be displayed as avatars carrying a bat or sitting on a bench.

In a further embodiment, a similar conceptual analysis can be applied to the grouped augmentations to derive a cluster concept based on common properties of the grouped augmentations. The common properties can comprise a certain range of shared characteristics. The format can be derived from the cluster concept and can be adapted to exhibit several aspects, such as behavior, appearance, and interactivity, of the cluster or the grouped augmentations. For example, when a cluster groups augmentations representing visitors to a park from different nations, the cluster concept can be international avatars. As such, a cluster grouping visitors from Germany can be formatted as an avatar holding a German flag. Additionally, an analysis of the grouped augmentations (e.g. the German visitors) may reveal that most augmentations are visiting the park to take pictures of objects therein. Based on this analysis, the format of the cluster (e.g. the avatar holding a German flag) can be further updated to incorporate a camera.

Similarly, the format of a cluster can be determined relatively to formats of other clusters. Multiple clusters can be comparatively analyzed. For example, ratios of cluster characteristics (e.g. number of augmentations, data size in bytes, etc.) may be calculated to derive relative cluster sizes. The relative cluster sizes can be used to update the formats of the compared clusters. In the previous example, if a cluster of USA visitors is rendered with an avatar holding a USA flag, the USA and German clusters can be compared. The comparison may reveal that the USA cluster has twice the number of visitors than the German cluster. As such, the avatar holding the USA flag can be displayed on a graphical user interface with a size twice as large as the avatar holding the German flag.

In a further embodiment, the format can be refined by also considering the user's context. The user's context can be retrieved and analyzed to determine properties that can be applied to the format. For example, avatars holding flags can represent clusters of park visitors from different nations. The avatars can be further updated to reflect some or all aspects of the user's context. When analyzing the user's context, a list of friends may be retrieved. As such, a cluster comprising an augmentation associated with a friend from the list can be updated. The update can comprise adding the words "A Friend Is Here" to the avatar.

Referring to FIG. 7, the rendering format of a cluster as an exemplar can be adjusted based on a wide range of factors and goals. In an embodiment, appearance of an exemplar may be adjusted to provide an aggregation of collapsed classes of attributes. The appearance may comprise look, sound, and feel attributes exhibited by the cluster or the augmentation data grouped therein. For example, in an embodiment in which augmentations are represented as avatars, a format can use the height of the exemplar to indicate the number of grouped avatars into the cluster. Further, the format can use clothing and accessories of the exemplar to represent a nationality. Considering the example of visitors to a park, a French cluster 710 representing a small number of French tourists may be formatted to appear short, wearing a beret, and carrying a baguette, while an American cluster 720 representing a large number of American businessmen may be formatted to appear tall, slim, and dressed in a suit.

The augmentation data may also exhibit behaviors responsive to the aggregated classes of attributes. The behaviors can be analyzed to derive the format. For example, if most of the American avatars in the cluster are very active (e.g. moving around the park), the American cluster 722 may be updated or formatted to represent a jogging avatar. Similarly, if most of the French avatars were relaxing in the park (e.g. having a conversation), the French cluster 712 may be updated or formatted to represent a more sedentary avatar such as one sitting on a park bench.

Responsive to the aggregated classes of attributes, the augmentation data may further exhibit interactivity or interactions between the augmentations, the clusters, and/or the user 730. The interactions can be analyzed to derive or refine the formats. For example, the user 730 can be fluent in English and eager to learn French. An interaction between the user 730 and the American cluster 722 can comprise an exchange of text messages in English with all the American avatars comprised in the American cluster 722. An interaction between the user 730 and a French avatar contained in the French cluster 712 can comprise launching a translation application or program and translating text messages exchanged between the user 730 and the French avatar.

In an embodiment, a user can access and expand the cluster and interact with one or more augmentations grouped therein. For example, a user interested in playing a game of chess can access a cluster representing avatars with the same interest, select one of the avatars, and start a chess game with the selected avatar. In a further embodiment, a user can interact with the cluster or the class of clusters. In such embodiment, interactions received from the grouped augmentations contained in the cluster can be presented to the user in a raw format or can be rendered according to the clustering and rendering techniques described herein. For example, a user may be interested in improving his or her cooking skills and may interact with a cluster representing cooks from around the world. The user may ask the cluster for a recipe and some of the cooks may respond back to the request. The responses can be presented to the user in the received order. Additionally or alternatively, the responses can be grouped and rendered as exemplars representing clusters of cooks known to the user, special diet recipes, and recipes provided by restaurants.

The determination of the rendering format can be independent of input from the user and can be instead based on the augmentation data. The format can also take advantage of properties derived from the user's context. In other words, the user need not specify the format of the augmentations or clusters because the exemplars can be derived automatically.

Figure 8:
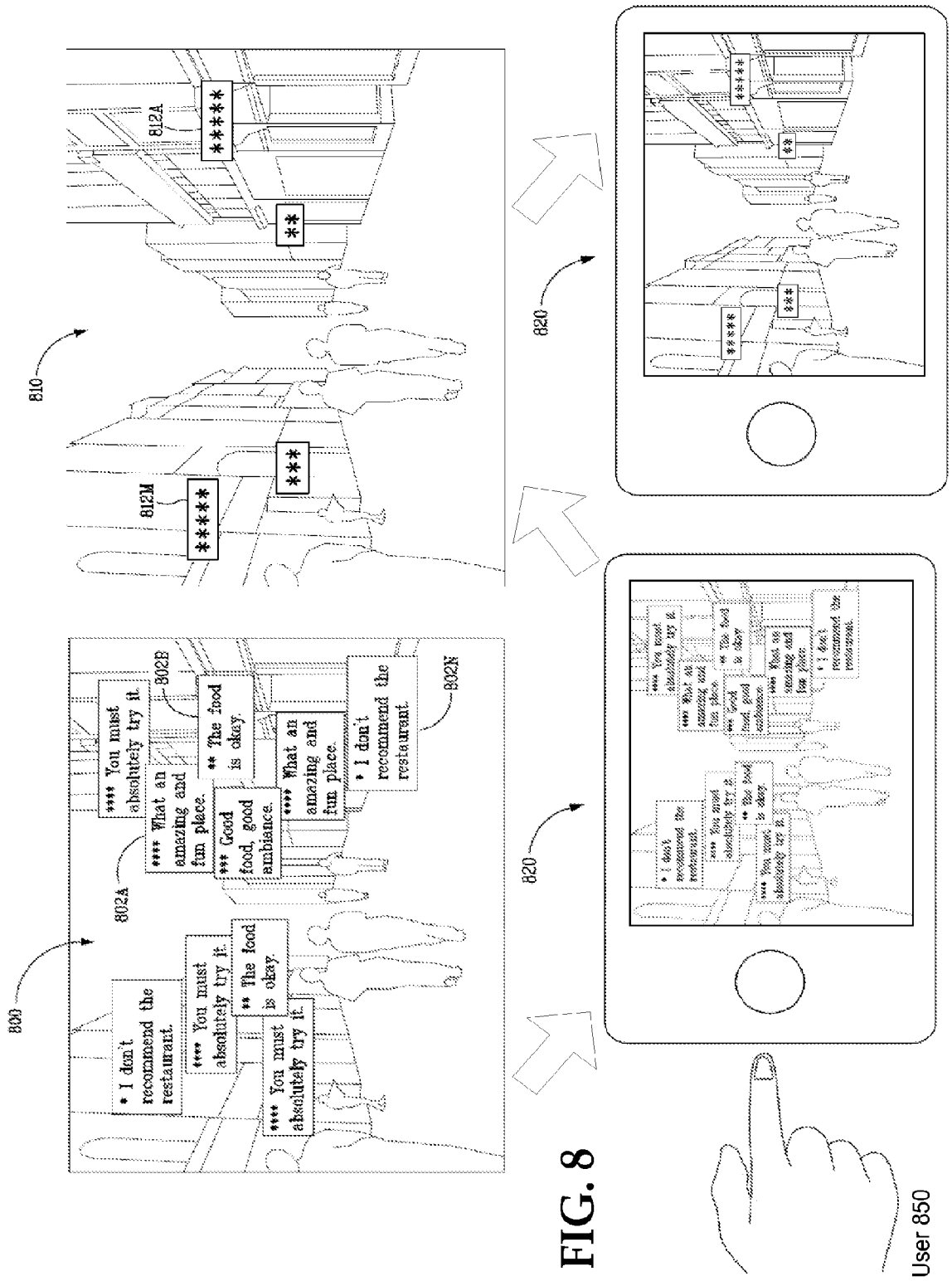
FIG. 8 depicts an example of an augmented reality view before and after augmentations are clustered and the resulting exemplars are rendered.

FIG. 8 depicts an example of an augmented reality view before and after augmentations are clustered and the resulting exemplars are rendered. In an embodiment, a smartphone 820, such as a GOOGLE ANDROID phone, a MICROSOFT WINDOWS phone, or an APPLE IPHONE, connected to the Internet can execute an application for an augmented reality exemplar as described herein. For example, a user 850 may be standing on a busy street corner in Washington D.C. around lunchtime, looking for something to eat, and is surrounded by restaurants but does not know which one to choose. The user 850 may launch a restaurant finder application on the smartphone 820 and pan up and down the street using the smartphone 820. On the smartphone's 820 screen, the user 850 can receive and view an augmented reality version 800 of the street. At first, the user 850 may see a large number, maybe in the thousands, of restaurant review annotations 802A-N over the entire screen. An annotation 802 may include other people's ratings and comments about each restaurant. The large number of annotations 802A-N and their overlapping presentations can prevent the user 850 from even seeing the restaurants and reading many ratings and comments.

Luckily, the user 850 can run the augmented reality exemplar application 810 on the smartphone 820 and in few seconds, all the annotations 802A-N can start to cluster together in exemplars 812A-M. The total number "M" of exemplars 812A-M can be substantially smaller than the total number "N" of annotations 802A-N. Further, the representation of an exemplar 812 can be much simpler than the representation of an annotation 802. An exemplar 812 for a restaurant review can look like a simple one-to-five star flag with a color coding. As such, the street scene can be easier to understand immediately. Using this type of exemplars, the restaurants 810 can have black-colored ratings floating above them. The augmented reality exemplar application may display an exemplar 812A with the maximum rating of five stars over the nearest restaurant to the user 850. However, the black stars may not quite be as dark as the black stars rendered above some of the other nearby restaurants. In fact, the stars of the exemplar 812A may be displayed with a quite pale color.

The color shade can reflect the number of augmentations clustered together to generate the exemplar 812A. In other words, darker displayed stars can indicate a larger number of people rating a restaurant. As such, the exemplar 812A with the pale color can indicate that the nearest restaurant with the five stars may not have had many people rate it. The user 850 may not think that he or she should trust a rating, even a five star rating, from an establishment with so few reviews.

Further, the color can provide additional cognitive information to the user 850. For example, black-colored stars can be ratings by people that the user 850 does not know, whereas brightly-colored stars can be ratings by friends of the user 850. Continuing with the restaurant example, the augmented reality exemplar application 810 may display all black-colored stars for the nearest restaurant and brightly-colored stars above some of the other restaurants nearby. These more colorful stars can indicate ratings from friends of the user 850. So, the user 850 may turn the smartphone 820 away from the black five-star restaurant to find a place that has the most colorful stars. The augmented reality exemplar application 810 may display to the user 850 a bright green five-star restaurant located across the street. The user 850 may perceive that a lot of his or her friends positively enjoy the located restaurant and may decide to pocket the smartphone and rush across the street for lunch.

Figure 9:
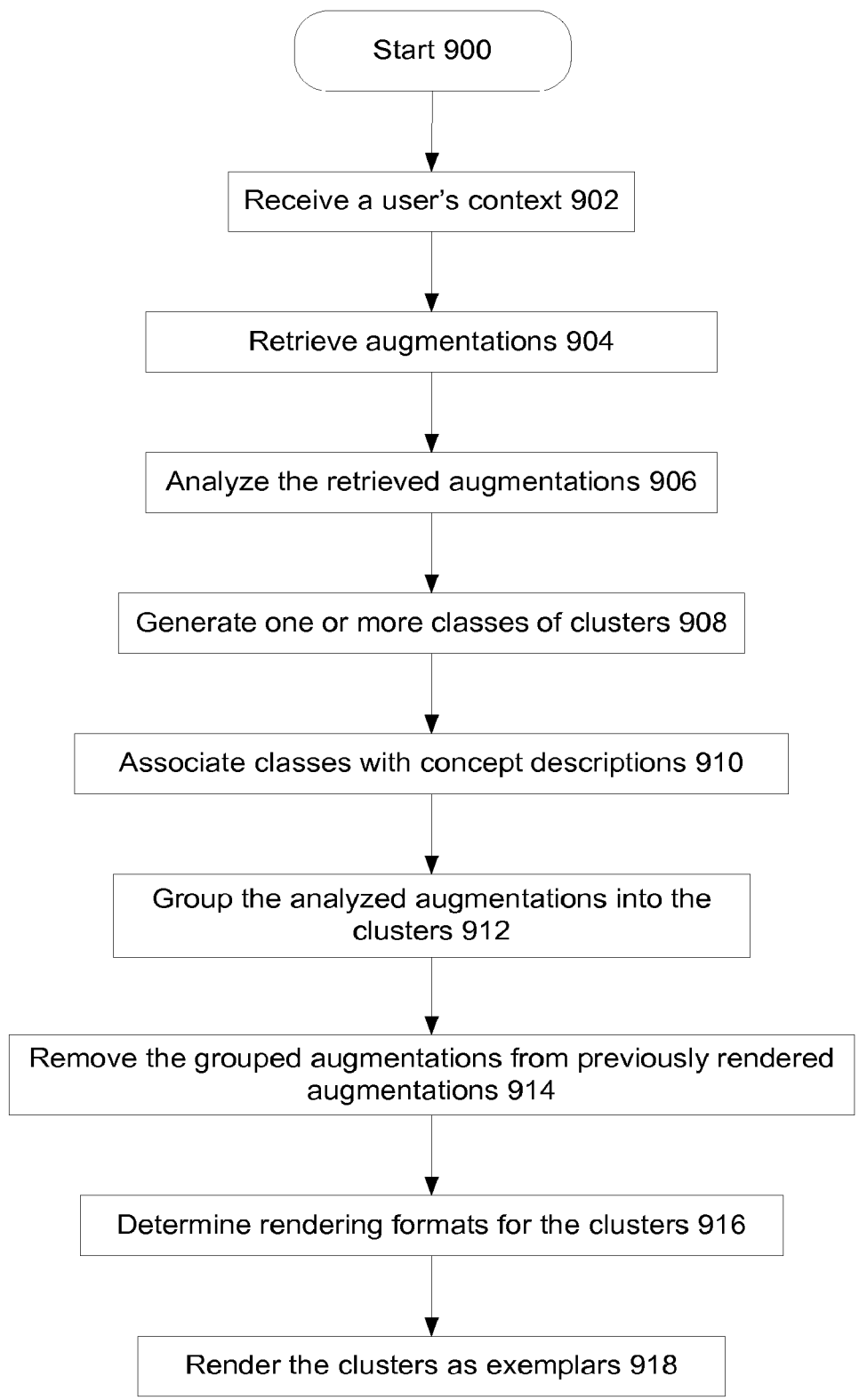
FIG. 9 depicts an example operational procedure for grouping augmentations and rendering the resulting exemplars.

FIG. 9 depicts an example operational procedure for grouping augmentations and rendering the resulting exemplars including operations 900, 902, 904, 906, 908, 910, 912, 914, and 918. Operation 900 starts the operational procedure, where an augmented reality application or service may be activated on an augmented reality device, such as any of the devices 210 of FIG. 2. Operation 900 may be followed by operation 902. Operation 902 (Receive a user's context) illustrates receiving a user's context. The user's context may include information about the user's physical and virtual environments. Operation 902 may be followed by operation 904. Operation 904 (Retrieve augmentations) illustrates determining augmentations based on the received user's context. The augmented reality device can access or connect to a repository of augmentations and use the user's context to retrieve the appropriate augmentations. The augmented reality device may or may not render these augmentations to the user and may proceed to generate clusters and exemplars comprising some or all of the retrieved augmentations. Operation 904 may be followed by operation 906.

Operation 906 (Analyze the retrieved augmentations) illustrates analyzing the retrieved augmentations. Based on the received user's context, the retrieved augmentations, and other factors, one or more conceptual clustering algorithms can be retrieved from a library and applied to some or all of the retrieved augmentations. Operation 906 may be followed by operation 908. Operation 908 (Generate one or more classes of clusters) illustrates generating one or more classes of clusters. The classes of clusters can comprise hierarchical category structures based on the analyzed properties of the augmentations. Operation 908 may be followed by operation 910. Operation 910 (Associate clusters with concept descriptions) illustrates associating each class with a concept description. The concept descriptions may be derived from the analyzed properties. Operation 910 may be followed by operation 912. Operation 912 (Group the analyzed augmentations into the clusters) illustrates grouping the analyzed augmentations into clusters within the appropriate classes. The grouping can be based on the concept descriptions. Operation 912 may be followed by operation 914.

Operation 914 (Remove the grouped augmentations from previously rendered augmentations) illustrates removing the grouped augmentations from previously rendered augmentations. Operation 914 can be optional and can depend on whether the available augmentations under operation 904 are initially rendered to the user. Operation 914 may be followed by operation 916. Operation 916 (Determine rendering formats for the clusters) illustrates determining rendering formats for the generated clusters. For each cluster, operation 916 can determine a renderer or a format based on the associated concept description, properties of the grouped augmentations, the user's context, or formats of other clusters. Operation 916 can be independent of input from the user. Operation 916 may be followed by operation 918. Operation 918 (Render the clusters as exemplars) illustrates rendering the clusters as exemplars. The rendering can be based on the determined formats and can comprise conceptual representations of the clusters.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A system to display augmented data, comprising:
a processor; and
a memory communicatively coupled to the processor, the memory bearing processor instructions that, when executed by the processor, cause the system to at least:
determine augmentation data based on a context associated with a user device, the augmentation data comprising a plurality of augmentations, each of the plurality of augmentations associated with one of a plurality of physical venues including a certain physical venue, and wherein the context includes information regarding the user's environment;
generate one or more clusters, each cluster of the one or more clusters comprising a subset of the plurality of augmentations, wherein each cluster of the one or more clusters represents one of the plurality of physical venues;
grouping each of the plurality of augmentations into one of the one or more clusters based on a respective location of the plurality of physical venues;
determine rendering formats for each of the one or more clusters, wherein the rendering formats determine at least a look of conceptual representations of the one or more clusters, wherein the look of the conceptual representation of a cluster is based on at least a first property of the subset of the plurality of augmentations grouped into the cluster, and wherein the conceptual representation is different from individual augmentations within the cluster, and
wherein a respective rendering format for a certain cluster of the one or more clusters associated with the certain physical venue is based on the subset of the plurality of augmentations associated with the certain physical venue, and wherein the certain cluster of the one or more clusters comprises at least one lower-level cluster, wherein the rendering formats for the at least one lower-level cluster is based on an at least one second property of a second subset of the subset of the plurality of augmentations.

2. The system of claim 1 further comprising instructions that, when executed, cause the system to remove portions of previously transmitted augmentation data to define a subset of the previously transmitted augmentation data, and transmit the subset of the previously transmitted augmentation data, rendering formats for the subset, the generated clusters, and the rendering formats for the generated clusters.

3. The system of claim 1, wherein the instructions to determine augmentation data comprises retrieving augmentation data from a repository, and wherein the context comprises information about physical and virtual environments associated with the user device.

4. The system of claim 1, wherein the instructions to generate clusters comprises:
analyzing properties of the augmentation data;
generating classes of clusters based on the analyzed properties;
associating the generated classes with descriptions; and
grouping the augmentation data into the one or more clusters based on the descriptions associated with the classes of clusters.

5. The system of claim 4, wherein the analyzing properties of the augmentation data comprises determining one or more clustering algorithms from a library of algorithms and applying the one or more clustering algorithms to the augmentation data to derive the properties and to generate the descriptions to be associated with the classes, and wherein determining the one or more clustering algorithms is based on the context and the augmentation data.

6. The system of claim 1, wherein the instructions to determine rendering formats for the generated clusters comprises deriving properties determined for the one or more clusters based on the grouped augmentation data and using the derived properties to create the conceptual representations of the one or more clusters.

7. The system of claim 6, wherein the conceptual representations of the generated clusters comprise visual, auditory, and haptic representations of the properties exhibited by the one or more clusters.

8. The system of claim 6, wherein the deriving the properties comprises analyzing the grouped augmentation data to determine appearance, behavior, and interactivity properties of the grouped augmentation data.

9. The system of claim 8, wherein the appearance properties comprise look, sound, and feel characteristics common to the augmentation data.

10. The system of claim 8, wherein the behavior properties comprise a behavior common to the augmentation data.

11. The system of claim 8, wherein the interactivity properties comprise an activity common to the augmentation data.

12. The system of claim 1, wherein the rendering formats comprise a simplified representation of grouped augmentation data in a given cluster.

13. The system of claim 1, further comprising processor instructions that, when executed, cause the system to render the certain cluster of the one or more clusters as an exemplar based on the respective rendering format; and merge the exemplar of the certain cluster with an image of a scene to generate a virtual image, wherein the exemplar includes avatars based on the subset of the plurality of augmentations.

14. The system of claim 1, further comprising an image capture device and processor instructions that, when executed, cause the image capture device to capture data for displaying the image of the scene.

15. The system of claim 1, wherein the scene is associated with a first set of coordinates and wherein the rendering formats are associated with a second set of coordinates, the system further comprising processor instructions that, when executed, cause the system to align the rendering formats with the image of the scene based on the first and second sets of coordinates.

16. A method to render augmented reality data on a computing device, comprising:
sending, by the computing device to an augmented reality service, a context of the computing device, wherein the context includes information regarding the user's environment;
receiving, from the augmented reality service, data representing clusters comprising one or more groupings of augmented reality data, the data generated based on the context and comprising formats for the clusters, wherein the formats are indicative of augmented reality data grouped in the clusters, and wherein each of the formats comprises sensory representations reflecting visual properties of grouped augmented reality data exhibited by each corresponding generated cluster in a form of avatars in a virtual image, wherein the sensory representations are different from any individual augmented reality data of the grouped augmented reality data in a respective cluster;
generating, via the augmented reality service, at least one lower-level cluster for at least one of the clusters based on a respective format of the formats associated with the at least one lower-level cluster, wherein the respective format comprises sensory representations reflecting visual properties of a subset of the grouped augmented reality data corresponding to the at least one of the clusters of the at least one lower-level cluster; and
rendering the clusters based on the received data.

17. The method of claim 16 further comprising:
receiving, by the computing device, additional augmented reality data omitted from the received clusters; and
rendering the received clusters and the additional augmented reality data.

18. The method of claim 16, wherein the clusters are generated by determining a plurality of clustering algorithms based on the sent context and the augmented reality data and applying the plurality of clustering algorithms to the augmented reality data.

19. The method of claim 16, wherein the sensory representations comprise visual, auditory, and haptic representations of the properties exhibited by the generated clusters.

20. The method of claim 16, wherein the properties exhibited by the generated clusters are derived from appearance, behavior, and interactivity of the one or more augmented reality data grouped into the generated clusters.

21. The method of claim 16, wherein respective ones of the rendered formats comprise a simplified representation of the augmented reality data grouped in a respective cluster.

22. A non-transitory computer readable storage medium having stored thereon instructions that when executed by one or more processors, cause the one or more processors to perform:
determining augmentations in response to identifying a context of a user device, each of augmentations associated with one of physical venues including a certain physical venue;

grouping the augmentations into clusters, each cluster representing one of the physical venues;

deriving information for the clusters, the information indicative of conceptual representations of the clusters reflecting the augmentations grouped in the clusters, wherein the information includes concept descriptions of the augmentations grouped in the clusters, the concept descriptions based on properties of the augmentations grouped in the clusters, and wherein the concept descriptions are indicative of at least a look of the conceptual representations as determined by the properties of the augmentations; and rendering the clusters based on the information, wherein the rendering the clusters based on the information comprises rendering a certain cluster of the clusters associated with the certain physical venue based on a combination of augmentations grouped into the certain cluster, wherein the certain cluster further comprises at least one lower-level cluster rendered based on the properties of a subset of the combination of augmentations grouped into the certain cluster.

23. The non-transitory computer readable storage medium of claim 22, wherein the grouping the augmentations into clusters comprises:

determining a clustering algorithm based on at least the augmentations;

applying the clustering algorithm to the augmentations to analyze properties of the augmentations;

generating classes of clusters with hierarchical category structures based on the analyzed properties;

tagging each generated class of clusters with a concept description based on the analyzed properties; and using the concept description to sort the augmentations into the clusters within the classes.

24. The non-transitory computer readable storage medium of claim 22, wherein the deriving information for the clusters comprises deriving properties of the clusters, wherein the derived properties reflect at least behavior, appearance, and interaction of the augmentations grouped into the clusters, and wherein the conceptual representations comprise visual, auditory, and haptic information for rendering the clusters according to the derived properties.

25. The non-transitory computer readable storage medium of claim 22, wherein the rendered clusters comprise a simplified representation of the augmentations in a given cluster.

26. The non-transitory computer readable storage medium of claim 22, wherein the properties of augmentations are visual properties of augmentations including avatars in a virtual image.

* * * * *